United States Patent [19]

Heller et al.

[11] 4,010,922

[45] Mar. 8, 1977

[54] PORTABLE POST SUPPORT

[76] Inventors: Thomas L. Heller, 12 Wootton Road, Essex Fells, N.J. 07021; Leonard C. Heller, 40 Oak Lane, Randolph, N.J. 07801

[22] Filed: Jan. 2, 1976

[21] Appl. No.: 645,943

[52] U.S. Cl. .............................. 248/165; 151/14 R; 248/170; 248/186

[51] Int. Cl.² ........................................ F16M 11/32

[58] Field of Search ......... 151/14 R; 248/163, 178, 248/186–188, 188.2, 188.4, 188.6, 188.7, 165, 166, 170, 13, 351, 352, 519, 528, 529

[56] References Cited

UNITED STATES PATENTS

| | | | |
|---|---|---|---|
| 131,696 | 9/1872 | Mathewson | 248/170 X |
| 1,444,569 | 2/1923 | Starkweather | 248/188.6 X |
| 1,787,270 | 12/1930 | Hayden | 248/170 |
| 1,863,756 | 6/1932 | Lufkin | 248/170 |
| 2,094,486 | 9/1937 | Cohen | 248/165 |
| 2,234,945 | 3/1941 | Baumbach | 151/14 R |
| 3,070,389 | 12/1962 | Baur et al. | 248/187 X |
| 3,180,602 | 4/1965 | Monell | 248/170 |
| 3,204,899 | 9/1965 | Danielewicz | 248/528 X |
| 3,233,517 | 2/1966 | Morrison | 248/166 X |
| 3,415,476 | 12/1968 | McDermott | 248/166 |

FOREIGN PATENTS OR APPLICATIONS

| | | | |
|---|---|---|---|
| 1,217,170 | 12/1959 | France | 151/14 R |
| 13,474 | 7/1892 | United Kingdom | 248/188.6 |

*Primary Examiner*—Lawrence J. Staab
*Attorney, Agent, or Firm*—Ralph R. Roberts

[57] ABSTRACT

A portable post support for cartridge reloading apparatus and like bench-type apparatus includes a central post preferably having threaded upper and lower ends. On the upper end of this post is mounted a collar member which is selectively locked in a desired orientation by a pressure or thrust plate and moved by a screw which is threadedly mounted in this collar member. A mounting plate for removably holding the accessory apparatus to the post support is attached to this upper collar member. The lower end of the post carries a leg support member in which four legs are removably mounted in an X-type pattern. Two front legs are the normally longer legs and a tie or retaining strap near their ends maintain these legs in the desired spaced array. A pair of shorter legs furnish the rear leg support and extends from this leg support member. An adjusting screw is associated with one of the legs and is adjusted as required to cause the four legs to rest equally on the support surface where the stand is to be used.

9 Claims, 4 Drawing Figures

4,010,922

PORTABLE POST SUPPORT

BACKGROUND OF THE INVENTION

1. Field of the Invention

With reference to the classification of art as established in the United States Patent and Trademark Office the present invention is found in the general Class entitled, "Supports" (Class 248) and in the subclass therein entitled, "stands-plural leg" (subclass 163) and in the subclass entitled, "folding" (subclass 166). Also of note is the subclass entitled, "all legs intersect at common center" (subclass 431).

2. Description of the Prior Art

Tripods in collapsible form are, of course, well known and are found in use particularly as stands for microphones, portable seats, cameras, geometric instruments such as transits and levels and many other devices. In most of these devices the legs are pivoted and equal and radiate either as three or four legs from a common center. These legs in addition to their generally pivoted construction often times are pivoted so as to lay against the column of the support. A stiffener brace is used with such legs. In the present stand support it is contemplated that this portable support will carry a bench-type implement or instrument which will be used to swage or otherwise shape and form cartridge cases, perform loading operations, crimping operations and the like. In these particular instances it is anticipated that an arm or lever will be a portion of the apparatus encouraging a large amount of downward pull. Hammering or other large downward forces may be applied. In order to provide a post which will withstand a downward applied force without collapsing it is necessary that the post support be rugged and heavy-duty and as such it is contemplated that it will be constructed of iron or steel. Such a support post assembly will, of course, be heavy and awkward to transport and for the convenience of the user it is contemplated that the leg portions will be removable and may be packed in a separate manner when the portable post is disassembled for transport. The leg construction must also be heavy-duty when assembled. It is further contemplated that the top of the post will have an adapter plate which will permit the ready and selective removable mounting of various types of bench-type apparatus so that a sequence of operations may be performed using the same post support.

In order to provide the desired rigidity and support it is contemplated that the front legs will be much longer than the rear legs and will have a tie bar or brace to prevent the extended legs from spreading or moving during the operation of the support post. This brace will also enable the user to place his foot on the brace to steady the post as downward force is applied. It is also contemplated that these front legs, as well as the rear legs, will be arranged at an approximately 60° included angle rather than the right angle normally found in a standard support device.

SUMMARY OF THE INVENTION

This invention may be summarized at least in part with reference to its objects.

It is an object of this invention to provide, and it does provide, a portable post in which the legs are removable and in which a bench-type apparatus to be carried by this post is also readily removable and mountable on an adapter plate carried by the post.

It is a further object of this invention to provide, and it does provide, a simple and sturdy portable post in which the front legs are extended and braced in a manner to allow heavy downward forces to be applied on the post support without overturning or straining the post.

This portable post, herein disclosed, is particularly adapted for cartridge reloading apparatus which requires a heavy downward application of force. A central post which is preferably of pipe carries on its upper end a collar member which is selectively locked in the desired orientation by application of a screw force on a pressure or thrust plate. This plate when locked in position also positions an adapter support plate which removably carries the bench-type apparatus in the desired oriented position. Secured to the lower end of this post is a base member which carries front and rear legs in an X-type array with the two front legs normally longer than the rear legs. The front legs which accept most of the downward thrust are prevented from moving toward or away from each other by the restriction provided by a tie strap. The legs are removably mounted in slots provided in this base and are rotated into a desired stop position whereby they are locked by means of a pivot pin. An adjusting screw is associated with one of the legs so that this fourth leg can be brought into coincidence of the ground or floor support surface after three of the legs have been brought to rest on this support surface.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen a specific embodiment of the portable support post as adopted for use with bench-type apparatus such as cartridge reloading apparatus and showing a preferred means for removably securing this bench-type apparatus to an adapter plate. This specific embodiment has been chosen for the purpose of illustration and description as shown in the accompanying drawings wherein:

BRIEF DESCRIPTION OF THE DRAWINGS

In the following description and in the claims various details are identified by specific names for convenience. These names, however, are intended to be generic in their application. Corresponding reference characters refer to like members throughout the several figures of the drawings.

The drawings accompanying, and forming part of, this specification disclose certain details of construction for the purpose of explanation of the invention, but it should be understood that these structural details may be modified in various respects without departure from the concept and principles of the invention.

DESCRIPTION OF THE PREFERRED EMBODIMENT OF FIGS. 1, 2 AND 3

Figure 1:
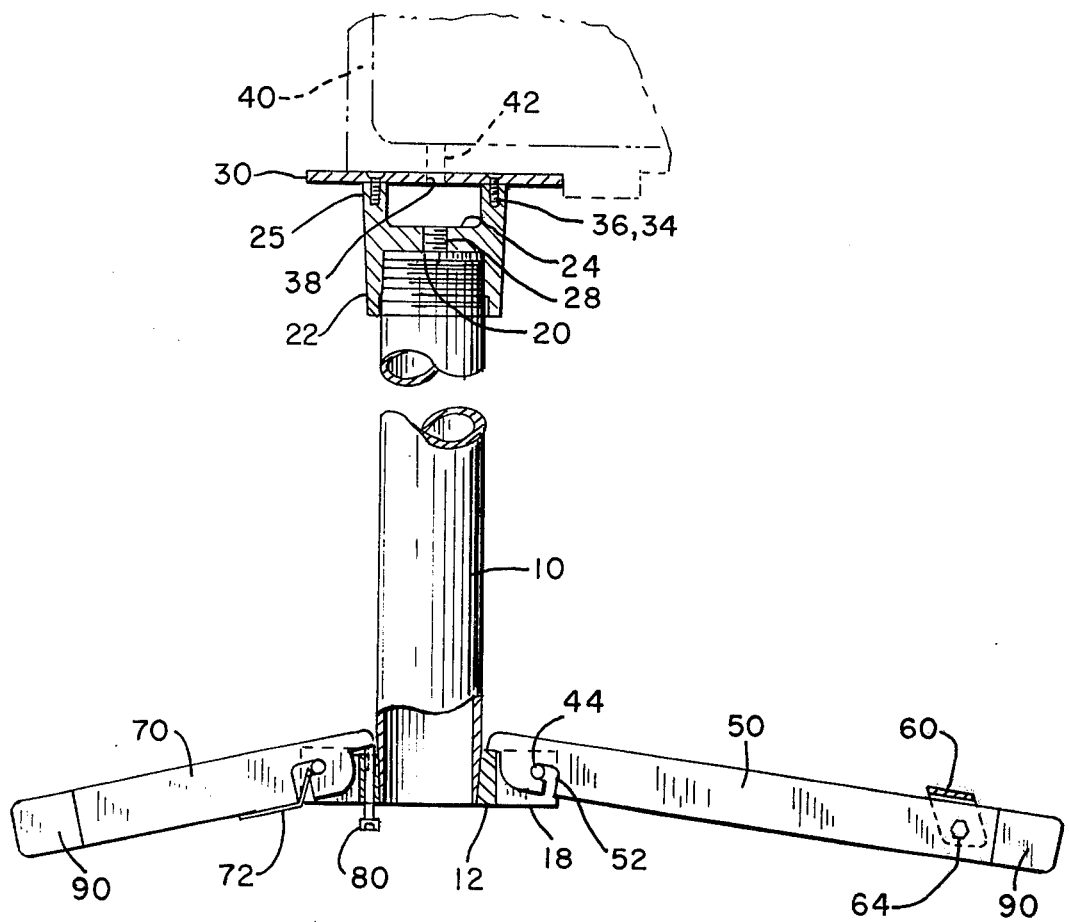
FIG. 1 represents a side view of the support post of the invention, this view partially in section to better illustrate the construction and relationship of the several parts forming the post assembly.
Figure 3:
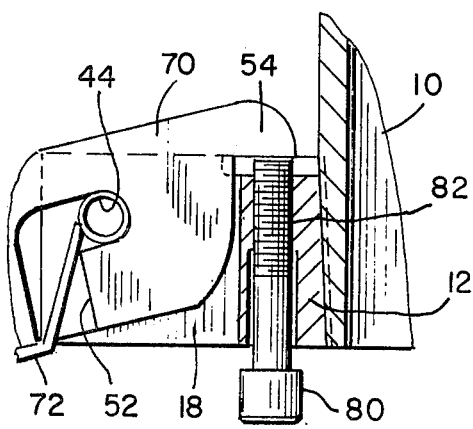
FIG. 3 represents a fragmentary sectional side view in an enlarged scale and showing a preferred means for adjusting the resting level of one of the legs.
Figure 2:
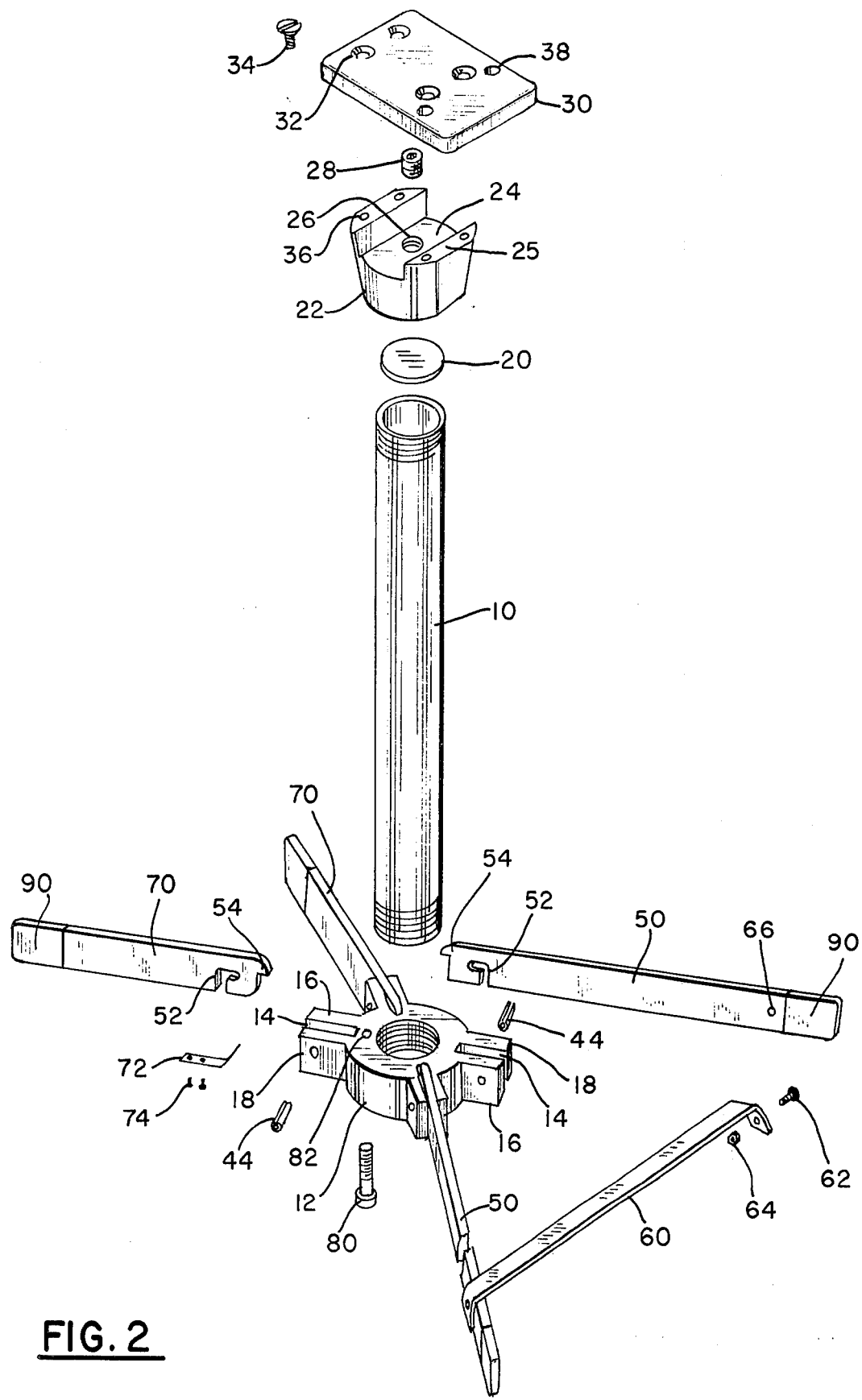
FIG. 2 represents an exploded isometric view of the several components which comprise this portable post assembly.

Referring next to the preferred embodiment of FIGS. 1, 2 and 3, it is to be noted that a support column 10 which is preferably a galvanized or otherwise rustproof pipe is threaded at both ends. This pipe is of a selected length which in erected condition and with the associated apparatus brings the top of the table post and the mounted apparatus to a workbench height. The lower end of this pipe is screwed into a base member 12 in which are formed slots 14 between extending ear portions 16 and 18. As exemplified, this base member 12 has four extending ear portions having ears 16 and 18 on each side of the slots 14. These ears are arranged in an X-type array with the slots arranged at approximately a sixty degree included angle. The retention of these removable legs is hereinafter more fully described. Although ear portions 16 and 18 are shown as a part of base member 12, the base may be an oval member without ears but with appropriately formed slots.

Although as shown the slots 14 and the ears 16 and 18 are alike this does not necessarily require that they be alike since the leg retaining slots may be made of different sizes to accommodate different thicknesses and lengths of legs. Hereinafter more fully described are legs of the same general cross section.

Carried on top of column 10 is a thrust plate 20 which is retained on top of this pipe by means of a shoulder portion formed on the inside of an adapter support 22. This adapter support is threaded to easily fit the threaded upper end of the column 10. This adapter support has a closed end 24 above which are shelf support portions 25. In this closed end portion 24 is approximately centrally formed a threaded aperture 26 in which is mounted a hollow head set screw 28. This set screw 28 when turned into engagement with the thrust plate 20 provides the clamping means by which the selected orientation of the adapter support 22 is made and maintained in fixed orientation with the column 10.

Attached to the adapter support 22 is an adapter plate 30. Formed in the adapter plate 30 are countersunk holes 32 in which flat head screws 34 pass to mount in threaded holes 36 formed in adapter support 22. Four screws 34 hold this adapter plate 30 in the desired position on the adapter support 22. Locating holes 38 may be provided in adapter plate 30 for the repeatable placement of the bench-type apparatus on this plate.

In FIG. 1 is shown in phantom outline a bench-type apparatus generally identified as 40. This apparatus is positioned on plate 30 by means of locating pins 42 which enter holes 38. The bench-type apparatus may include cartridge closing and/or other type of apparatus for the reuse of cartridge casings, particularly for target shooting. Other types of bench-type apparatus may, of course, be used with this post. This post is of steel which allows a heavy downwardly applied force to be accommodated.

Referring now to the lower portion of the post assembly it is to be noted that the base 12 is tightly screwed onto the lower end of the pipe support column 10. This base in addition to a tight application to the pipe may be additionally retained on this thread by means of an adhesive or locking pin or dowel. Mounted transverse of each of the slots 14 are pivot or dowel pins 44 which in the particular embodiment are retained in holes formed in ear portions 16 and 18. In two of the slots 14 are removably mounted front legs 50, each of which has formed on its inner end a keyslot 52 which is more-or-less L-shaped and is hereinafter more fully described. The keyslots 52 are slidable on pivot pin 44. The inner ends of the legs 50 have projecting ear portions 54 and when the legs are in mounted condition they engage the top of the base 12 to establish a limit of the turning movement of the front legs 50 around pivot pin 44. Extending between the two front legs 50 is a support brace 60 which is secured to the front legs by means of bolts 62 and nuts 64. Bolt 62 passes through a hole 66 in the leg 50 and also one of the like-sized holes formed in the downturned portion of the support bar 60. This support bar, in mounted condition, in addition to stiffening the front legs against outward movement also provides and enables the user of the apparatus to place a foot upon the brace to steady the post and inhibit movement when extra exertion is applied.

The rear legs, as depicted, are shorter than the front legs and, as shown, are identified as 70. Like the front legs the rear legs also have L-shaped slots 52 formed in the inner end which is also provided with ear stops 54 which establish the level of the ends of the legs. It is intended that these rear legs 70, when mounted in position, be retained in this position by means of leaf springs 72. Each leaf spring 72 is retained in position by means of flat head screws 74 which pass through appropriate holes in the spring and into tapped holes formed in legs 70. Since four legs are difficult to equally engage a support surface, particularly on outside ground, it is contemplated that three of the legs will be allowed to engage the ground and form a tripod engagement. The fourth leg is brought into the desired engagement with the ground surface by means of a leveling screw arrangement. This leveling screw is identified as 80 and is carried in a tapped hole 82 formed in base 12.

Use and Operation

Figure 4:
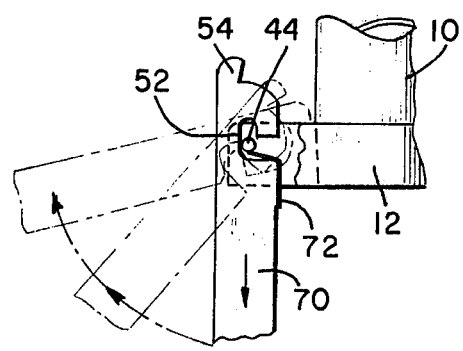
FIG. 4 represents a fragmentary side view which diagrammatically shows the steps of mounting the end of a leg in a mounting slot in the post base member.

In use, it is contemplated that the post 10 and base 12 assembled are secured in a fixed manner so that the base is firmly secured to the post. The thrust plate 20 is placed upon the top of the pipe 10 and the adapter holder 22 is threaded on the top of the post with shelf supports 25 upwardly directed. Adapter plate 30 is secured to the adapter support 22 by means of screws 34. Prior to the placing of the bench-type apparatus 40 on the adapter plate 30 the legs are mounted in position. To mount the legs in the slots 14 reference is made to FIG. 4 where, as depicted, a leg is positioned more-or-less parallel to the post and is moved into the slot in the leg and onto the pivot pin with the long end of the leg extending below the base 12. The slot 52 is presented to the pin 44 and this pin is pushed all the way into the slot. The leg is then pulled downwardly to cause the pin 44 to move into the key portion of the slot extending toward the inner end of the leg. Once in this position the leg is rotated, as shown by the arrows, until the ear 54 engages the top of the base 12. With the front legs 50 in position, the leg brace 60 is secured in position by means of two bolts 62 and two nuts 64. The rear legs are then mounted to the base. The support post is placed upon the ground and screw 80 is manipulated to cause all four legs to be brought into the desired ground engagement.

With the legs in the desired support position the adapter plate 30 is aligned with the legs so that the overhang of the apparatus 40 is aligned over the front legs 50 and the downward thrust is taken by the front legs. The adapter plate 30 is now locked into position in the desired orientation. This orientation is locked by screw 28 which is tightened down against plate 20 to cause the adapter support 22 to be lifted into a jammed condition as far as the threads on the post are concerned. When screw 28 is tightened adapter holder 42 is locked in this desired orientation. Clearance is provided by the upstanding shelf portions 25 which support the adapter plate 30. This clearance is a matter of design as to the length of the supporting shelves 25 in member 22. These shelves extend upwardly from the closed end to provide a support for the adapter 30 and permit a socket head wrench, not shown, to enter the socket head cap screw 28. This screw is turned to engage the plate 20 and lock the member 22 in the desired orientation with regards to the placement of the legs 50 and 70.

It is to be noted that on the ends of the legs 50 and 70 are shown boots 90 which may be of plastic and which provide protection against sharp edges of the metal legs. These boots also provide antimarking means for the legs when this post is used on concrete or on surfaces such as plastic tile and the like.

The tool post support herein shown has roll pins 44. Instead of pins 44, through holes in the ears and legs may have pins that pass through the through holes. These pins may be retained by cotter pins or nuts.

It is to be contemplated that no matter what the manner of attachment the front and rear legs will have stop means which may be similar to the ears 54, depicted. The turning movement of the legs will be limited and the ends of the legs as they engage the support surface cause the center post to be lifted to an extent sufficient to keep the center post from resting on or engaging the support surface.

Terms such as "left", "right", "up", "down", "bottom", "top", "front", "back", "in", "out" and the like are applicable to the embodiment shown and described in conjunction with the drawings. These terms are merely for the purposes of description and do not necessarily apply to the position in which the support post may be constructed or used.

While a particular embodiment of the support post has been shown and described it is to be understood the invention is not limited thereto since modifications may be made within the scope of the accompanying claims and protection is sought to the broadest extent the prior art allows.

What is claimed is:

1. A post support stand for cartridge rebuilding, reconditioning and like bench-type tool apparatus, this stand having folding legs for selected collapse, storage, transport and the like, said stand having legs which are retained at one end by a common base member, said support stand including: (a) a support column; (b) a base member adapted to engage and retain the lower end of said column in an attitude substantially normal to the plane of the base member; (c) an apparatus tool holder rotatably mounted on the upper end of the support column; (d) means for locking the apparatus tool holder in a selected orientation on the column including a threaded end on the support column with the tool holder carried on this threaded end and a thrust plate positioned between the end of the column and the tool holder, and there is a jam screw carried in a threaded aperture in the tool holder, this jam screw turned into engagement with the thrust plate to cause the tool holder to be locked in the desired orientation on the column; (e) four legs retaining slots having a selected size and orientation formed in the base member; (f) two front legs and two rear legs slidably and pivotally and removably mounted in the retaining slots in the base member and in mounted and extended condition the legs form an X-type configuration, said front legs being the longer pair of legs; (g) a retaining pivot pin carried in each slot and extending at least substantially therethrough, this pin providing a means for pivotally retaining one end of a leg when mounted in the leg retaining slot; (h) a mounting end formed on one end of each leg, this mounting end slidable in an appropriately sized slot in the base member and in this end is formed a pin engaging slot, this slot sized for an easy sliding fit on the retaining pivot pin, said engaging slot extending inwardly from one longitudinal edge and terminating intermediate the longitudinal edges whereat the slot turns for a short distance substantially parallel to the longitudinal axis of the leg and toward the end of the leg to be retained in the slot, this extension of the slot providing a pivot retention portion when and as it engages the pivot pin, and (i) cooperative means provided on the leg and base member to limit the rotative motion of each leg around the pivot pin when and after the leg has been slidably mounted on the pin, this limiting movement causing the outer ends of each of the legs to engage the support surface before the support column and the base member engage the support surface when in an erected condition.

2. A post support stand as in claim 1 in which there is a leg brace adapted to be removably mounted on the pair of front legs to fix their relationship and spacing from each other.

3. A post support stand as in claim 1 in which there is provided an adjusting screw which is in association with the end of a leg and is rotatably adjusted to position one of the legs in the slot so as to level the fourth leg for positive engagement of the support surface after the three other legs have been positioned.

4. A post support stand as in claim 3 in which the adjusting screw is carried in a threaded aperture in the base member with the end of this adjusting screw engaging an ear portion on the end of the associated leg to establish and maintain the rotative limit of the leg.

5. A post support stand as in claim 1 in which the cooperative means provided by the legs and base member includes a shoulder on the base member which engages an ear stop provided on the end of the leg, the ear engaging the base member shoulder to limit the rotation of the leg to an open condition.

6. A post support stand as in claim 1 in which the tool holder additionally has tapped holes by which an adapter plate may be mounted on the holder, this adapter plate enabling the rapid removable mounting of the bench-type apparatus on the stand.

7. A post support stand as in claim 1 in which the support column has a threaded lower end and the base member is provided with complementary threads and the base member is screwed onto the column.

8. A post support stand as in claim 1 in which the rear legs are additionally provided with retaining springs mounted so as to extend into the engaging slot in the leg, this spring engaging the pivot pin when the leg is mounted thereon with the spring preventing accidental and unwanted dislodgement of the leg from the pin.

9. A post support stand as in claim 1 in which each of the legs are provided on their outer end with boot members providing a resilient antimar protector for the legs against and on the support surface.

* * * * *